United States Patent [19]

Gould

[11] Patent Number: 4,624,782

[45] Date of Patent: Nov. 25, 1986

[54] FILTERING APPARATUS

[75] Inventor: Michael H. Gould, Belfast, Ireland

[73] Assignee: National Research Development Corporation, London, England

[21] Appl. No.: 686,672

[22] Filed: Dec. 27, 1984

[30] Foreign Application Priority Data

Dec. 29, 1983 [GB] United Kingdom ............... 8334550

[51] Int. Cl.⁴ ..................... B01D 23/10; B01D 23/24
[52] U.S. Cl. .................................. 210/268; 210/279; 210/291
[58] Field of Search ................................. 210/792–796, 210/189, 268, 269, 279, 285, 286, 289, 291

[56] References Cited

U.S. PATENT DOCUMENTS 4,197,201 4/1980 Hjelmner et al. .................... 210/268
4,330,401 5/1982 Boze et al. ........................... 210/268

FOREIGN PATENT DOCUMENTS 298835 10/1928 United Kingdom .

Primary Examiner—Ivars Cintins

Attorney, Agent, or Firm—Cushman, Darby & Cushman

[57] ABSTRACT

Filtering apparatus of the sand-circulating type in which the backwashing conduit means, by which the filtering medium is circulated from the bottom of the bed to the top and washed in the process, are located around the periphery of the vessel. The conduit means may comprise a series of tubes, each associated with a water jet and equispaced around the vessel wall. Emerging from the tubes, the washed medium may be constrained to pass radially inwards between upper and lower guiding baffles before finally falling onto the top of the bed. The support plate on which the bed rests may be upwardly conical in shape, may contain water nozzles to help direct the lower part of the bed towards the backwashing conduit, and may be formed with perforations through which filtrate may pass. The distribution of perforations across the support plate may vary progressively, being least at the vessel axis and greatest close to the vessel wall, to help promote an even rate of flow of filtrate through the bed across its entire area.

6 Claims, 2 Drawing Figures

FILTERING APPARATUS

This invention relates to filtering apparatus of the kind often known as a "sand" filter, in which contaminated water or other liquid is filtered by passing through a bed of sand or other particulate filtering medium. It is customary periodically to cleanse and redistribute such beds by "backwashing" them. In some designs, for instance the one shown in UK Specification No. 298835, a vertical tube is located within the bed so that its inlet lies close to the bottom of the bed and its outlet slightly above the top of the bed, and a jet nozzle connected to a pressurised source of clean water is located just below the mouth of the tube and pointing upwards into the tube. When backwashing is to take place, the normal supply of contaminated water to the filter is cut off, and time allowed to pass for any water in the filter to pass through the bed. The high pressure supply of clean water to the jet is then turned on, and the injector action of the combination of the jet and the backwashing tube sucks sand into the tube inlet, lifts it up the length of the tube and then ejects it from the outlet of the tube after which it falls by gravity back on to the top surface of the bed. As the water and sand rise together within the tube they form a very turbulent mixture in which strong shear forces are exerted upon the particles of sand so that adhering contaminant particles are separated from them. When the sand particles fall back on to the bed after the mixture emerges from the tube outlet, the contaminant particles remain in suspension in the washing water which rises to a level above the top of the bed and leaves the filtering vessel by way of an outlet at that level.

While some designs of this general type have been manufactured, the typical geometry of such apparatus has been such that the shape of the base supporting the filter medium has been downwardly-conical or downwardly-convex, with the inlet to the backwashing tube situated centrally so that it lies close to the point of the cone or the lowest point of the convexity. I have discovered that with such an arrangement, especially in apparatus in which the bed rests on a perforated surface through which the filtrate descends after passing through the bed, there is often a tendency for the normal alternating periods of filtration and backwashing to cause the surface of the bed to take up a profile containing a pronounced cavity coinciding with the backwashing tube or tubes, the depth of the cavity being greater than the vertical dimension of the convex or conical base. This has resulted in uneven filtering in which the contaminated water has tended to flow preferentially through certain parts of the bed, rather than equally over the whole plan area, and also in restricted circulation of the particles of the bed during backwashing, those close to the backwashing tubes undergoing more circulation than those further away which may not pass into the backwashing tube at all.

According to the present invention filtering apparatus comprises a vessel of vertical axis, adapted to contain particulate filtering medium supported on a surface that allows filtrate to pass and which spans the vessel and slopes downwardly away from the axis. A plurality of backwashing tubes are regularly spaced around the periphery of the vessel and are each associated with water jets, by means of which tubes and jets the medium may simultaneously be recirculated from the lower to the upper part of the bed and be washed within the tubes as it is recirculated. The vessel is preferably cylindrical but may alternatively be of rectangular or other shapes.

The supporting surface may be so constructed—for instance by way of non-uniform distribution of porosity or perforations—so that the resistance that it offers to the passage of filtrate diminishes with increasing radius so as to counteract the effects on flow of a decreasing thickness of sand bed.

An annular baffle, sloping downwardly and inwardly away from the vessel wall, may be located with clearance above the tops of the backwashing tubes to provide an upper guide to direct the mixture of medium downwardly and inwardly as it emerges from the tops of the backwashing tubes. A second and lower annular baffle, located above the level of the bed and again sloping downwardly and inwardly away from the wall of the vessel, may provide a lower guide for the mixture of medium and water once it has emerged from the backwashing tubes, so that the upper and lower guides between them become the upper and lower boundaries of a slot-shaped passage through which the mixture of medium and water moves downwardly and inwardly once it has emerged from the backwashing tubes. The lower guide may contain perforations through which medium may pass to fall on to the bed beneath before it reaches the central hole of the lower guide.

An outlet for backwashing water may be located in the vessel wall above the level of the upper guide, backwashing water complete with entrained contaminants reaching this outlet by way of the central hole in the upper guide after passing inwardly and downwardly beneath that guide.

Water nozzles aimed radially-outwardly may be mounted on the supporting surface, so that water jets from thse nozzles may help to move the medium radially-outwardly towards the inlets of the backwashing tubes during backwashing.

The invention is also defined by the claims, the content of which is to be read as part of the disclosure of this specification, and the invention will now described, by way of example, with reference to the accompanying drawings in which:

Figure 1:
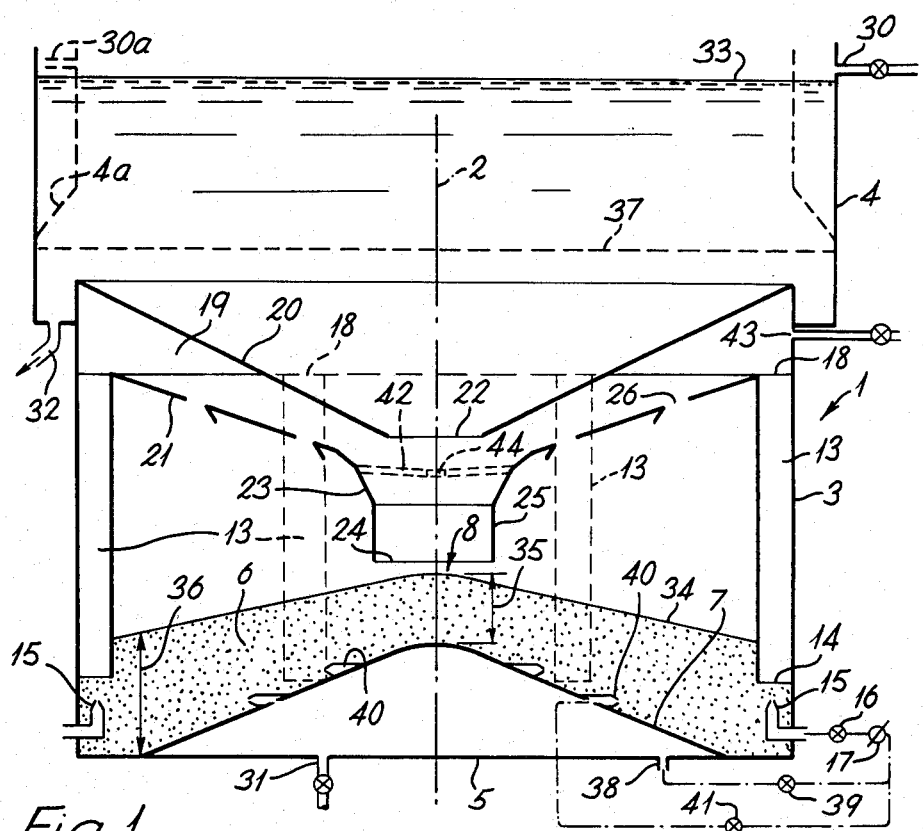
FIG. 1 is a diagrammatic axial section through an apparatus.
Figure 2:
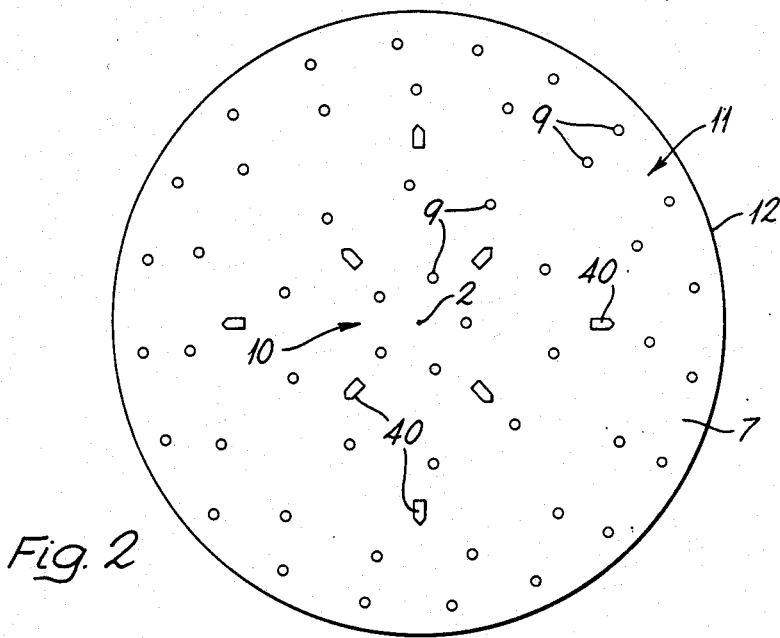
FIG. 2 is a diagrammatic plan view of the medium-supporting surface of FIG. 1.

The apparatus comprises a cylindrical vessel 1 formed about an axis 2 and having a stepped wall 3, 4 and a base 5. A bed 6 of particulate filtering medium—for instance sand—rests on a supporting surface 7 which spans the vessel and is of substantially conical shape with its apex 8 on the axis 2, so that the surface slopes downwardly away from the axis. As FIG. 2 shows best, surface 7 is formed with perforations 9, the dimensions of which are not to scale but are such that they retain the particles of filter medium while allowing filtrate to pass through. As FIG. 2 also diagrammatically shows, the distribution of perforations across the face of surface 7 changes progressively from relatively sparse in the region 10 close to axis 2, to relatively dense in the region 11 close to the periphery 12 of the surface.

A plurality of vertical backwashing tubes 13 (for instance six of them, as shown) are fixed to the lower part 3 of the vessel wall at even angular spacing. The inlet 14 of each tube is open to the filter medium at the periphery of the bed 6, and is also associated with a nozzle 15 connected by way of a tap 16 to a pressurised supply 17 of clean water. The outlet 18 of each passage 13 leads into a slot-shaped space 19 defined between upper and lower annular guide baffles 20 and 21. Both of these guides are essentially part-conical in shape, so that they slope downwardly and inwardly. Upper guide 20 is imperforate, with a simple hole 22 at the centre. Lower guide 21 is flared at 23 before its central hole 24 is defined by a cylindrical portion 25, and perforations 26 are formed in the main conical area of this lower guide. In filters of relatively small size it is probable that lower baffle 21 would be of less complex shape, more similar to that of upper baffle 20, with an imperforate outer part and a simple central hole.

During the normal filtering operation of such apparatus, contaminated water enters the vessel 1 through a valved inlet 30 in the upper part 4 of the vessel wall, an outlet 31 in base 5 is open, a second outlet 32 in wall 4 at or about level with the top of upper guide 20 is shut, and tap 16 is shut. The relative settings of inlet 30 and outlet 31 are such that the raw liquid maintains a level such as 33 within the vessel, the raw liquid reaches the bed 6 by way of the central holes 22 and 24 in the guides 20 and 21 respectively, and while contaminants within the raw liquid are retained by the bed the filtrate passes through the bed, through the perforations 9 in surface 7, and out of the vessel by way of outlet 31. The conical shape of the surface and the non-uniform distribution of the perforations 9 within the surface will be balanced to give the surface 34 of the bed a stable shape, conical like that of surface 7 but with a wider apex angle such that the height of the bed is least (35) at the axis and greatest (36) at the periphery, so that the inverse relationship of the bed height to the perforation density of the surface 7 tends to promote even resistance of the bed to fluid flow across its entire width, and thus even filtering action.

When it is wished to cleanse and redistribute the bed 6 by backwashing, inlet 30 is first closed, and time is allowed for the charge of raw liquid then present in the vessel to leave, after passing through bed 6, by way of outlet 31. Outlet 31 is then closed, outlet 32 is opened and tap 16 is opened so that high pressure jets of clean water from source 17 are fired up the vertical tubes 13, entraining medium from the periphery of bed 6 by injector action. Within each of the tubes 13 the mixture of medium and water becomes very turbulent and strong shearing forces are generated, which tend to separate each particle of medium from contaminants that have adhered to it. As the mixture emerges at speed from the outlet 18 of each tube the upper guide 20 constrains the mixture to turn downwardly and inwardly so that it passes down the space 19 between the guides 20 and 21. A certain proportion of the particles of medium will pass through perforations 26 and the remainder will return to the apex of the bed by way of central hole 24 of the lower guide 21. The proportions of perforations 26 and hole 24 will be chosen for each application so that the typical outcome of the return of the medium to the top of the bed during backwashing is such as to keep the preferred conical shape of the bed surface 34 as constant as possible. While the medium returns to the bed, the water constituent of the mixture rises through hole 22 to a level typically maintained at 37, and leaves the vessel by way of outlet 32. When filtering is to begin again, tap 16 and outlet 32 are closed, and inlet 30 and outlet 31 are opened once more.

An alternative arrangement of wall 4 and inlet 30—for instance as shown in broken outline at 4a and 30a—could save material.

Especially in the backwashing phases of large filters, radially-outward movement of the particles of the medium within the bed towards the nozzles 15 and the inlets 14 of the tubes 13 may be promoted by suspending the bed with clean water delivered to an inlet 38 in base 5 from source 17 by way of a tap 39, and especially by jets from nozzles 40 which are mounted on surface 7 so as to point radially-outwardly and connected to source 17 by way of a tap 41.

Again especially in large filters, in the filtration phase it may be preferable for the raw liquid to be more widely dispersed, as it meets the surface of the bed 6, than is possible when the apparatus is working as hitherto described and the predominant entry flow of the raw liquid is by way of the central hole 24 of lower guide 21. Such wider dispersion can be achieved by closing hole 24 (as by a plate shown in broken lines at 42) and by admitting the raw liquid not through inlet 30, but instead through an inlet 43 into the periphery of the space 19, so that the raw liquid falls on to the surface of the bed mainly through the perforations 26. Plate 42 should of course contain a drain hole 44 so that it does not become filled with a stagnant pool of raw liquid, and must of course be removable (by means not shown) for backwashing.

If desired, chemical coagulants may be added to the water in the space above hole 22. The volume of the space ensures that the water and coagulant have adequate contact time. With plate 43 in place, the resultant floc/water mixture would pass through hole 44 and space 19 so that the mixture would fall on to the bed surface 34 through perforations 26.

While it has been described with reference only to vessels, beds and related components that are circular when viewed in plan, the invention is not limited to that plan shape but includes others, for instance rectangular shape.

I claim:

1. Filtering apparatus comprising:
   a vessel, disposed about a vertical axis;
   supporting surface within said vessel, said supporting surface spanning said vessel and sloping downwardly away from the axis and being adapted to support a bed of particulate filtering medium;
   backwashing conduit means, regularly disposed around the periphery of said vessel; and
   water jets associated with said backwashing conduit means, by means of which backwashing conduit means and water jets said medium may simultaneously be recirculated from a lower part to an upper part of said bed and be washed within said backwashing conduit means as it is recirculated, said apparatus further including a plurality of water nozzles mounted on said supporting surface with said water nozzles being aimed radially-outwardly away from said axis so that water discharged by said nozzles will help move said medium radially-outwardly toward said backwashing conduit means during backwashing, said supporting surface being formed with a plurality of perforations to allow filtrate to pass, the extent of said perforations changing progressively with increasing radius away from said axis, being greatest in the vicinity of said periphery of said vessel so as to promote even flow of said filtrate through said bed across its entire plan area.

2. Filtering apparatus according to claim 1 including a first annular baffle, sloping downwardly and inwardly away from said periphery of said vessel and located with clearance above the tops of said backwashing conduit means to provide an upper guide to direct the mixture of medium and water downwardly and inwardly as it emerges from the tops of said conduit means.

3. Filtering apparatus according to claim 2 including a second annular baffle, sloping downwardly and inwardly away from said periphery of said vessel and located above the level of said bed but below said first annular baffle, to provide a lower guide for said mixture of said medium and said water once said mixture has emerged from said backwashing conduit means.

4. Filtering apparatus according to claim 3 in which said second annular beffle is formed with perforations through which said medium may pass to fall onto said bed beneath.

5. Filtering apparatus according to claim 2 including an outlet for said backwashing water, located in said periphery of said vessel above said first annular baffle.

6. Filtering apparatus according to claim 1 in which said backwashing conduit means comprise a plurality of vertical backwashing tubes regularly spaced around the periphery of said vessel, each said tube being associated with a said water jet.

* * * * *